United States Patent
Momoki

(10) Patent No.: US 8,325,267 B2
(45) Date of Patent: Dec. 4, 2012

(54) IMAGE PICKUP APPARATUS COMPRISING AN IMAGE PICKUP OPTICAL SYSTEM INCLUDING AN OPTICAL ELEMENT HAVING OPTICAL INCIDENT AND OPTICAL EMERGENT SURFACES AND A FINE TEXTURED STRUCTURE HAVING A MEAN PITCH SHORTER THAN A WAVELENGTH OF VISIBLE LIGHT, AND AN IMAGE PICKUP UNIT CONFIGURED TO RECEIVE AN IMAGE FORMED BY THE IMAGE PICKUP OPTICAL SYSTEM, AND MEETING A SPECIFIED DIAMETER CONDITION

(75) Inventor: Kazuhiko Momoki, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 12/559,812

(22) Filed: Sep. 15, 2009

(65) Prior Publication Data

US 2010/0066892 A1 Mar. 18, 2010

(30) Foreign Application Priority Data

Sep. 16, 2008 (JP) ................................ 2008-236316
Aug. 28, 2009 (JP) ................................ 2009-198414

(51) Int. Cl.
*H04N 5/225* (2006.01)
*G02B 5/02* (2006.01)
*G02B 13/20* (2006.01)
(52) U.S. Cl. ...................................... 348/340; 359/599
(58) Field of Classification Search .................. None
See application file for complete search history.

(56) References Cited

U.S. PATENT DOCUMENTS

| 7,268,948 B2 * | 9/2007 | Matsuo et al. ................ 359/575 |
| 7,336,421 B2 | 2/2008 | Tanaka |
| 2002/0067411 A1 * | 6/2002 | Thompson et al. ........... 348/207 |
| 2006/0158972 A1 * | 7/2006 | Kimura ....................... 369/44.23 |
| 2009/0067053 A1 * | 3/2009 | Momoki et al. .............. 359/599 |

FOREIGN PATENT DOCUMENTS

| JP | 2005-157119 A | 6/2005 |
| JP | 2005-316386 A | 11/2005 |
| JP | 2006-010831 A | 1/2006 |

* cited by examiner

*Primary Examiner* — Albert Cutler
(74) *Attorney, Agent, or Firm* — Canon USA, Inc., IP Division

(57) ABSTRACT

An image pickup apparatus includes an image pickup optical system and an image pickup unit configured to receive an image formed by the image pickup optical system. The image pickup optical system includes an optical element having optical incident and optical emergent surfaces disposed between an aperture stop and an object and a fine textured structure having a mean pitch shorter than a wavelength of visible light and formed on at least one of the optical incident and optical emergent surfaces. The conditions $3.5<RA/R0$ and $60°<2\omega$ are satisfied, where RA is an effective diameter of the optical surface having the fine textured structure, R0 is a diameter determined by a height when light rays forming an image on an optical axis pass through the optical surface having the fine textured structure, and $2\omega$ is an angle of view in image taking limited by a size of the image pickup unit.

3 Claims, 18 Drawing Sheets

IMAGE PICKUP APPARATUS COMPRISING AN IMAGE PICKUP OPTICAL SYSTEM INCLUDING AN OPTICAL ELEMENT HAVING OPTICAL INCIDENT AND OPTICAL EMERGENT SURFACES AND A FINE TEXTURED STRUCTURE HAVING A MEAN PITCH SHORTER THAN A WAVELENGTH OF VISIBLE LIGHT, AND AN IMAGE PICKUP UNIT CONFIGURED TO RECEIVE AN IMAGE FORMED BY THE IMAGE PICKUP OPTICAL SYSTEM, AND MEETING A SPECIFIED DIAMETER CONDITION

BACKGROUND OF THE INVENTION

1. Field of the Invention

The present invention is suited for an image pickup apparatus, such as a camcorder, that effectively performs antireflection employing a fine textured structure having the antireflection function disposed at a surface (at least one of optical incident and emergent surfaces) of a lens (optical member).

2. Description of the Related Art

Typically, a lens using a light-transmitting medium (light-transmitting member), such as glass or plastic, is subjected to surface treatment, for example, antireflection coating applied to an incident or emergent surface to reduce loss of transmission of light caused by surface reflection. A known example of an antireflection film with respect to visible light is a multilayer film in which a plurality of thin dielectric films are laminated. The multilayer film is provided by formation of a thin film made of, for example, a metallic oxide on a light-transmitting substrate surface by vacuum deposition.

Nowadays, it is desired that an optical system, for example, a lens for use in a digital camera, have high optical performance and be compact and lightweight as a whole. To respond that desire, a lens that has a large diameter or a lens that includes a surface having a small radius of curvature is being widely used.

When such a lens is used in an optical system, a light ray enters the outer region of the lens at a large angle. Because of this, it is difficult for an antireflection film composed of a single thin dielectric film or of laminated multiple thin dielectric films to satisfactorily reduce reflection because an incident angle is in a wide range. This causes undesired light, such as a ghost or flare.

In view of the circumstances, Japanese Patent Laid-Open No. 2005-316386 describes an optical system including a light-transmitting member that has a concave surface facing an aperture stop and that has an antireflection film formed on the light-transmitting member, the antireflection film including at least one layer formed by sol-gel process.

The optical system disclosed in this patent document achieves a low reflectance in a wide incident-angle range and reduces the occurrence of ghosts and flares.

A known example of an antireflection structure for use in a lens is a fine textured structure that has a mean pitch shorter than the wavelength of visible light described in Japanese Patent Laid-Open Nos. 2005-157119 and 2006-10831.

A digital camera for taking an image using an image pickup element (e.g., a charge-coupled device (CCD) or a complementary metal-oxide semiconductor (CMOS)) employs an APS-C size, which is smaller than a film size, in consideration of compatibility with an existing image taking lens in most cases.

As illustrated in FIG. 2, the dimensions of a film size (full size) 8 are approximately 24 mm long and 36 mm wide. The dimensions of an APS-C size 47 are approximately 15 mm long and 22.5 mm wide and approximately 1/1.6 of the full size.

An APS-C size camera has the same effect as in a trimming mode in image taking using a full-size film camera and has a smaller angle of view. Because of this, an image taken by an APS-C size camera is similar to that using a more telephotographic image taking lens.

The angle of view in image taking using an APS-size camera in which an interchangeable lens having the same focal length as in a film camera is attached is approximately 1.6 times that using the film camera in equivalent focal length. Accordingly, an APS-C size camera has the advantage of being able to take an image in a more telephotographic region using a telephotographic lens. However, with a standard lens (f=50 mm) or a similar one of a film camera or a wide-angle lens, an APS-C size camera has a smaller angle of view. Thus, an APS-C size camera needs a wider-angle image taking lens.

A typical standard zoom lens for a full-size camera has a focal length of the order of 28 mm at a wide-angle end, whereas an APS-C size camera needs a lens having a focal length of the order of 17 mm at a wide-angle end. Therefore, as a wide-angle lens for use in an APS-C size camera, a super wide-angle image taking lens, such as a lens having the 14 mm focal length or that having the 15 mm focal length, is being employed.

For these focal lengths, the angle of view diagonal at both sides in a film camera is very wide at approximately 110°. Accordingly, in a film camera, the outer diameter (effective diameter) of a lens element increases from the aperture stop toward the front. In particular, a front lens element has a spherical shape that has the center of curvature in the aperture stop or its vicinity and that has a larger angular aperture.

FIG. 24 is a cross-sectional view that illustrates an example of a wide-angle lens as an interchangeable lens for use in a single-lens reflex camera. As illustrated in FIG. 24, light rays to image heights pass through separate regions in the lens element nearest to the object.

In FIG. 24, lens elements 13 to 19, a variable stop 21, and a flare-cut stop 27 are illustrated.

FIG. 22 illustrates a range of effective light rays that pass through a lens surface of a single lens disposed between the object and the aperture stop 21.

In FIG. 22, reference numeral 48 depicts an effective range of light rays in the case of a full size, and reference numeral 49 depicts an effective range of light rays in the case of an APS-C size. As illustrated in FIG. 22, effective light rays for an APS-C size are represented by the substantially rectangular inner region 49 and corresponds to only a part of the lens diameter. When an APS-C size is used, light rays other than those passing through the region 49 are unnecessary. Such unnecessary light causes a ghost or flare.

Even if, in consideration of an effective diameter of light rays of an angle of view when a full size is used, a special light-shielding board 50 for flare cutting and for blocking transmission of light in the shaded region in FIG. 22 is provided in an optical path, its aperture portion has a size approximately twice the size of necessary light rays in the region 49 for an APS-C size. Accordingly, it is difficult to sufficiently avoid the occurrence of flares.

However, for a wide-angle lens illustrated in FIG. 24, the region 48 outside the region 49 illustrated in FIG. 22 is in the outer region of a lens surface G1b. Thus, the inclination of the lens surface is large, and the proportion of unnecessary light incident at more than 60° is also large.

An antireflection film including laminated multiple thin dielectric films aims to reduce reflectance by adjusting the refractive index and thickness of each film and causing reflected light occurring in a surface or interface to interfere with each other. Therefore, when the antireflection film is applied to a lens surface of an optical system, antireflection performance (antireflection function) is high at a specific wavelength or a specific incident angle.

However, there is a problem in which the antireflection performance is significantly low, that is, the wavelength range characteristic or incident angle characteristic is low at the other wavelength or the other incident angle.

In contrast, with a fine textured structure having a fine textured configuration formed on a lens surface, the antireflection characteristics having a good incident angle characteristic in a relatively wide range are readily obtainable.

However, for a wide-angle image taking lens, the incident angle of an off-axis ray to a lens surface is large. To obtain a good antireflection function (wavelength range characteristic) in a wide wavelength range and obtain a good antireflection function (incident angle characteristic) in a wide incident angle range, it is important to appropriately set application of a fine textured structure to a lens surface.

If a fine textured structure is applied to an inappropriate lens surface location in an image taking lens having a wide angle of view, a good antireflection effect is not obtainable. This causes many flares or ghosts, and it is difficult to acquire a high-quality image.

SUMMARY OF THE INVENTION

The present invention provides an image pickup apparatus including an image pickup optical system that has a good antireflection effect and that reduces the occurrence of flares and ghosts even when an incident angle to an optical surface is increased or even when image pickup elements having different image circles are used. This is achieved by use of a fine textured structure formed on an optical surface at which the difference between incident heights of off-axis rays passing through the optical surface is larger than a fixed amount when image pickup elements having different image circles are used.

According to an aspect of the present invention, an image pickup apparatus includes an image pickup optical system and an image pickup unit. The image pickup optical system includes an optical element having optical incident and optical emergent surfaces and a fine textured structure having a mean pitch shorter than a wavelength of visible light. The fine textured structure is formed on at least one of the optical incident and optical emergent surfaces. The optical element is disposed between an aperture stop and an object. The image pickup unit is configured to receive an image formed by the image pickup optical system. The following conditions are satisfied:

$$3.5 < RA/R0$$

$$60° < 2\omega$$

where RA is an effective diameter of the optical surface on which the fine textured structure is formed, R0 is a diameter determined by a height when light rays forming an image on an optical axis pass through the optical surface on which the fine textured structure is formed, and $2\omega$ is an angle (degrees) of view in image taking limited by a size of the image pickup unit.

According to another aspect of the present invention, an image pickup apparatus an image pickup optical system and an image pickup unit. The image pickup optical system includes an optical element having optical incident and optical emergent surfaces and a fine textured structure having a mean pitch shorter than a wavelength of visible light. The fine textured structure is formed on at least one of the optical incident and optical emergent surfaces. The optical element is disposed between an aperture stop and an object. The image pickup unit is configured to receive an image formed by the image pickup optical system. The following condition is satisfied:

$$\frac{R1^2 - R2^2}{R0^2} > 5$$

where, in a first image pickup range as an effective range of the image pickup unit and in a second image pickup range smaller than the first image pickup range, R1 is an effective diameter determined by a height when, among light rays forming an image at a maximum off-axis image height in the first image pickup range, a light ray that passes through a center of the aperture stop passes through the optical surface on which the fine textured structure is formed, R2 is an effective diameter determined by a height when, among light rays forming an image at a maximum off-axis image height in the second image pickup range, a light ray that passes through the center of the aperture stop passes through the optical surface on which the fine textured structure is formed, and R0 is a diameter when light rays forming an image on an optical axis pass through the optical surface on which the fine textured structure is formed.

Accordingly, the present invention can provide an image pickup apparatus including an image pickup optical system that has a good antireflection effect and that reduces the occurrence of flares and ghosts even when an incident angle to an optical surface is increased or even when image pickup elements having different image circles are used.

Further features of the present invention will become apparent from the following description of exemplary embodiments (with reference to the attached drawings).

DESCRIPTION OF THE EMBODIMENTS

An image pickup optical system for use in an image pickup apparatus according to embodiments of the present invention includes optical elements disposed between an object and an aperture stop. A fine textured structure is formed on at least one of optical incident and emergent surfaces of at least one of the optical elements. The fine textured structure has a mean pitch shorter than the wavelength of visible light.

The image pickup apparatus also includes an image pickup unit configured to receive an image formed by the image pickup optical system.

Embodiments of the present invention are described below with reference to the drawings.

First Embodiment

Figure 1:
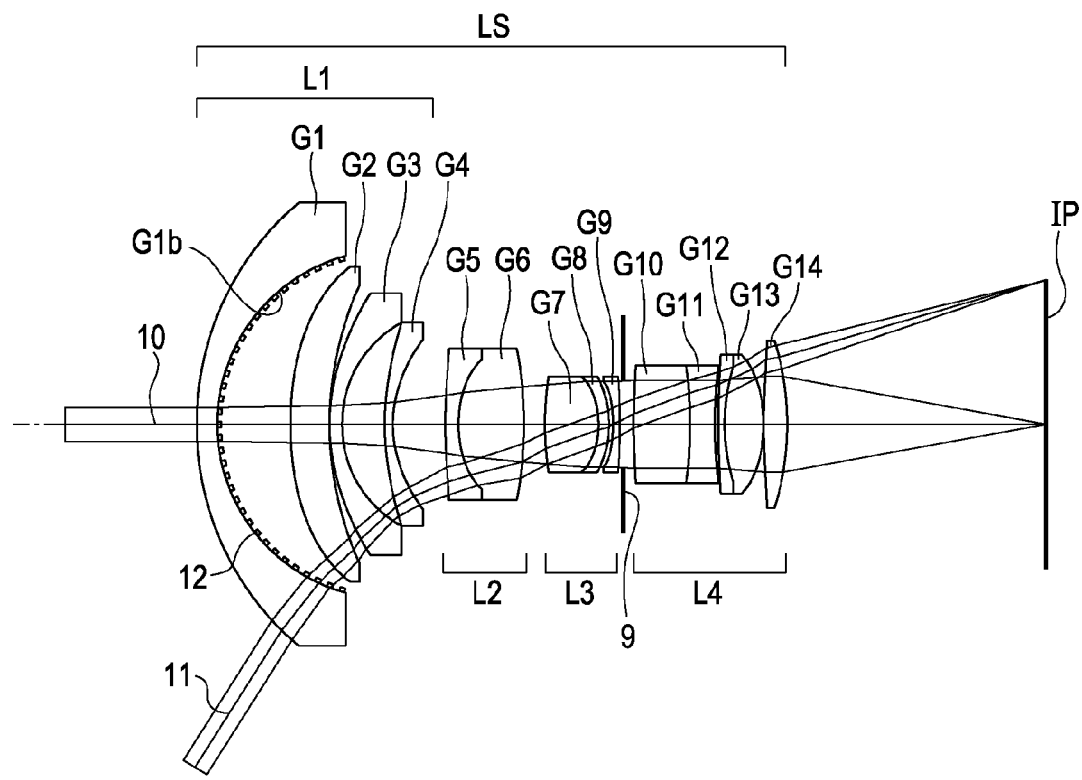
FIG. 1 illustrates a configuration of an optical system according to a first embodiment of the present invention.

FIG. 1 is a cross-sectional view of lens elements of an image pickup optical system for use in the image pickup apparatus according to a first embodiment of the present invention.

The first embodiment illustrates an optical path of an image taking lens (image pickup optical system) for use in an image pickup apparatus. The same applies to the other embodiments. In the cross-sectional view of the lens elements illustrated in FIG. 1, the left represents the object side (front) and the right represents the image side (rear).

The optical system of the first embodiment may also be used in an optical apparatus, such as a projector. The same applies to the other embodiments. In this case, the left represents a screen, the right represents a projected image, and a display element for displaying a projected image, such as a liquid crystal display element, corresponds to an image pickup element in an image pickup apparatus. Hereinafter, the optical system according to the first embodiment is also referred to as the "image taking lens."

The image taking lens according to the first embodiment is a wide-angle lens that has a focal length of approximately 14 mm and an angle of view in image taking of $2\omega=114°$.

In FIG. 1, the image taking lens LS includes a first lens unit L1 to a fourth lens unit L4.

The first lens unit L1 has a negative refractive power and includes a first lens element G1, a second lens element G2, a third lens element G3, and a fourth lens element G4. The second lens unit L2 includes a fifth lens element G5 and a sixth lens element G6. The third lens unit L3 includes a seventh lens element G7 to a ninth lens element G9. The fourth lens unit L4 includes a 10th lens element G10 to a 14th lens element G14.

An image pickup surface of a solid-state image pickup element (image pickup unit), for example, a CCD sensor or a CMOS sensor, is disposed at an image plane IP. A variable stop 9 is arranged between the third lens unit L3 and the fourth lens unit L4.

A fine textured structure 12 is formed on an optical surface G1$b$ of the first lens element G1. The optical surface G1$b$ faces the image side. The fine textured structure 12 has a pitch shorter than the wavelength of visible light (400 nm to 700 nm).

The optical surface G1$b$ of the first lens element G1 facing the image side is also referred to as the "fine textured surface G1$b$." Reference numeral 10 represents on-axis light rays, and reference numeral 11 represents outermost off-axis light rays when a full-size image pickup unit is used.

The light rays widen with distance from the variable stop 9 toward the object side. In particular, at the optical surface G1$b$, on which the fine textured structure 12 is formed, light rays corresponding to image heights are separated.

The effective diameter of the optical surface G1$b$ on which the fine textured structure is formed is RA. The diameter determined by the height at which light rays forming an image on the optical axis pass through the optical surface G1$b$ is R0. The angle of view in image taking limited by the size of the image pickup unit is $2\omega$ (degrees). At this time, the following conditions are satisfied:

$$3.5 < RA/R0 \quad (1)$$

$$60° < 2\omega \quad (2)$$

An effective range of the image pickup unit is referred to as a first image pickup range, and another effective range smaller than the first image pickup range is referred to as a second image pickup range.

An effective diameter determined by the height when, among light rays forming an image at the maximum off-axis image height in the first image pickup range, a light ray that passes through the center of the aperture stop passes through the optical surface on which the fine textured structure is formed is R1.

An effective diameter determined by the height when, among light rays forming an image at the maximum off-axis image height in the second image pickup range, a light ray that passes through the center of the aperture stop passes through the optical surface on which the fine textured structure is formed is R2.

The diameter when light rays forming an image on the optical axis pass through the optical surface on which the fine textured structure is formed is R0.

At this time, the following condition is satisfied.

$$\frac{R1^2 - R2^2}{R0^2} > 5 \qquad (3)$$

Here, the first image pickup range has a short side of approximately 24 mm and a long side of approximately 36 mm. The second image pickup range has a short side of approximately 24×k mm and a long side of approximately 36×k mm.

At this time, the following conditional expression is satisfied:

$$0.3 < k < 0.8 \qquad (4)$$

Figure 2:
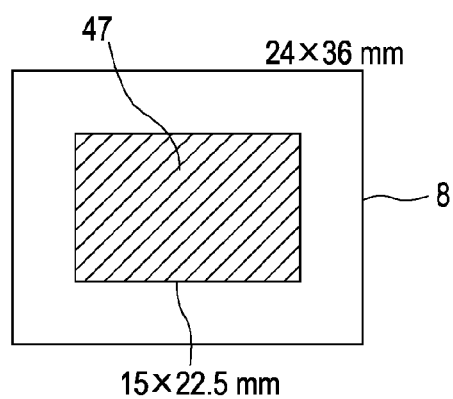
FIG. 2 illustrates an image pickup range according to the first embodiment.

FIG. 2 is an illustration for describing an effective screen used when an image is taken using the image taking lens according to the first embodiment.

In FIG. 2, an image pickup range 8 has a size of approximately 24 mm×36 mm (full size). An image pickup range 47 is smaller than the full size and has a size of approximately 15 mm×22.5 mm (APS-C size). The image taking lens LS according to the first embodiment uses both of these image pickup sizes.

Figure 22:
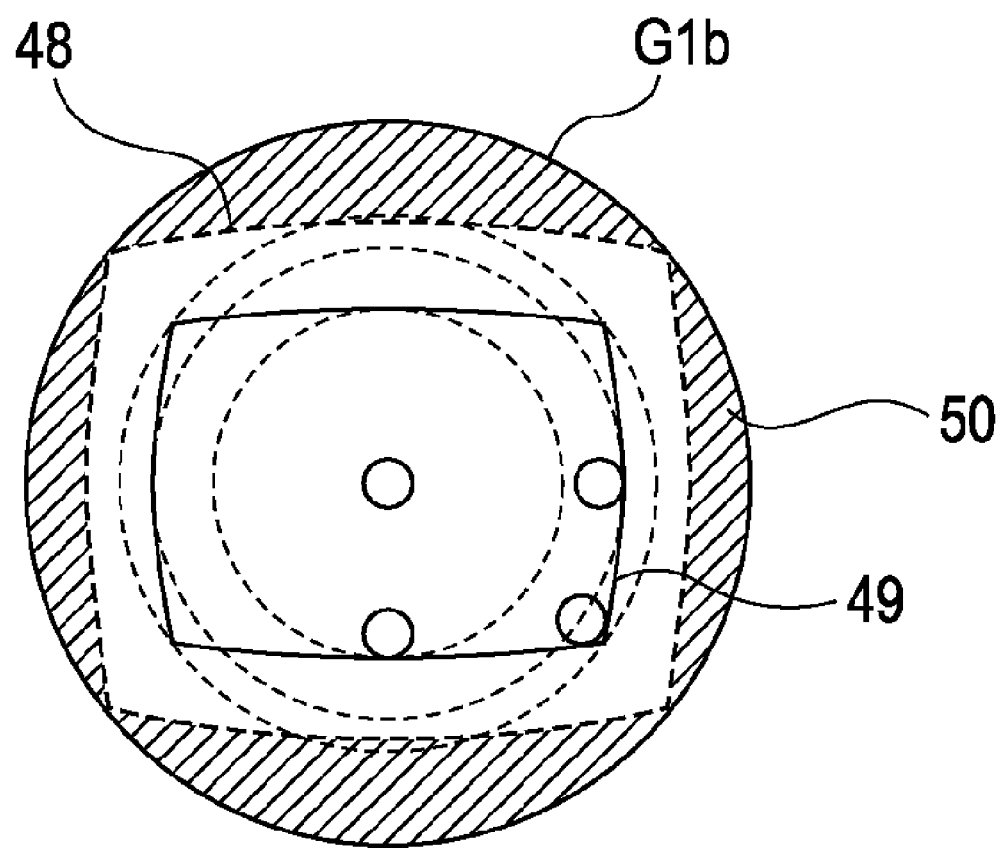
FIG. 22 is a schematic diagram that illustrates a range of necessary light rays in a first lens element.

FIG. 22 is an illustration for describing a state where light rays in image taking forming an image corresponding to the image pickup sizes 8 and 47 illustrated in FIG. 2 pass through the fine textured surface G1b of the first lens element G1.

At the fine textured surface G1b illustrated in FIG. 22, an outer range 48 represents a region through which the light rays corresponding to the full size pass. An inner range 49 represents a region through which the light rays corresponding to the APS-C size pass.

As illustrated in FIG. 22, in image taking using an APS-C size as the image taking screen, the light rays in regions outside the range 49 are all unnecessary. The unnecessary light results in flares and ghosts. Ideally, the light rays in the regions outside the range 49 should be blocked.

However, it is difficult for an image taking lens targeted for an image taking screen that can use different image taking screen sizes to block the unnecessary light.

In the present embodiment, the occurrence of flares and ghosts caused by the unnecessary light at this time can be minimized by use of an appropriate configuration of the textured structure of the fine textured surface G1b.

Figure 20:
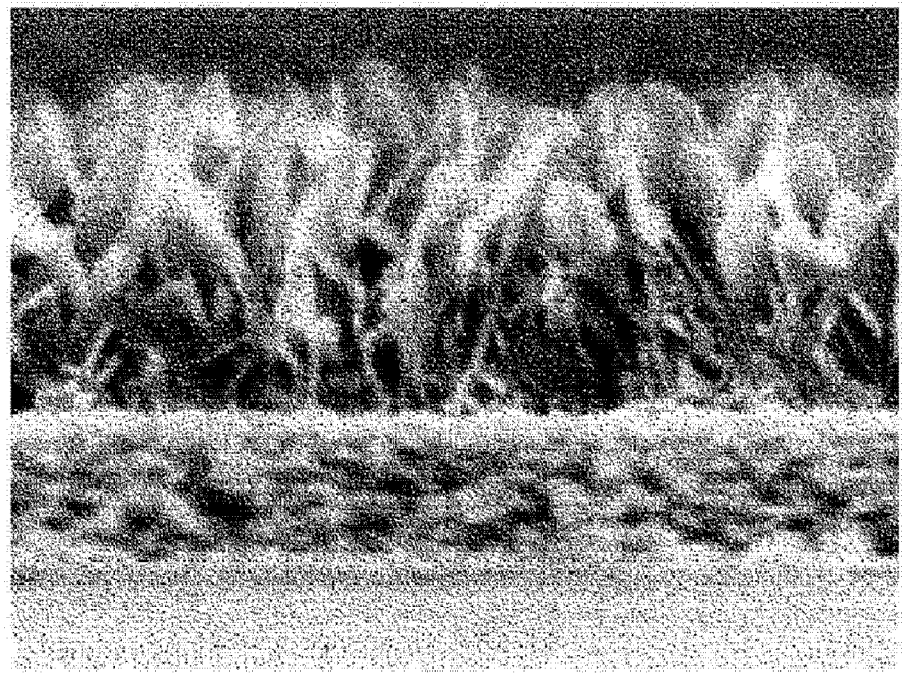
FIG. 20 illustrates a SEM photograph of a fine textured structure having a mean pitch shorter than a wavelength of visible light from in a cross-sectional direction.
Figure 21:
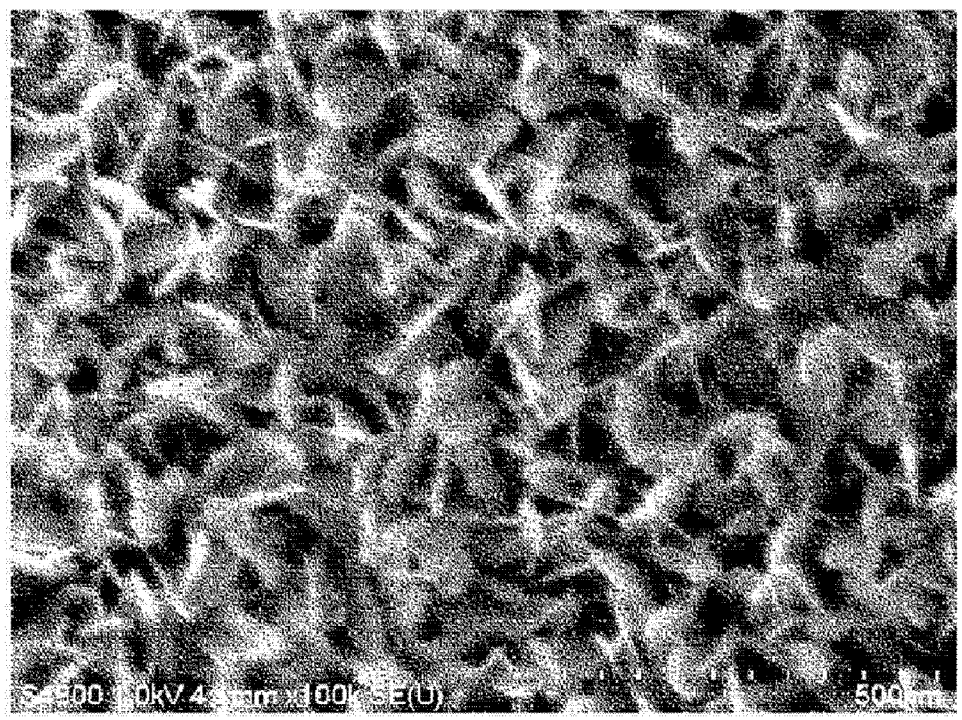
FIG. 21 illustrates a SEM photograph of a fine textured structure having a mean pitch shorter than a wavelength of visible light from an interface.

FIGS. 20 and 21 illustrate SEM photographs of the fine textured structure formed on the fine textured surface G1b.

FIG. 20 illustrates a SEM photograph of the fine textured structure in a laterally viewed cross section. FIG. 21 illustrates a SEM photograph of the fine textured structure observed from above the surface. The fine textured structure is made of crystals crystallized into a petal form. The density of the fine textured structure is the highest in a substrate interface (lens surface) and its vicinity and decreases with distance from the interface (lens surface).

The fine textured structure is sufficiently fine with respect to the visible light, so it serves as a thin film having an equivalent refractive index (effective refractive index).

Figure 17:
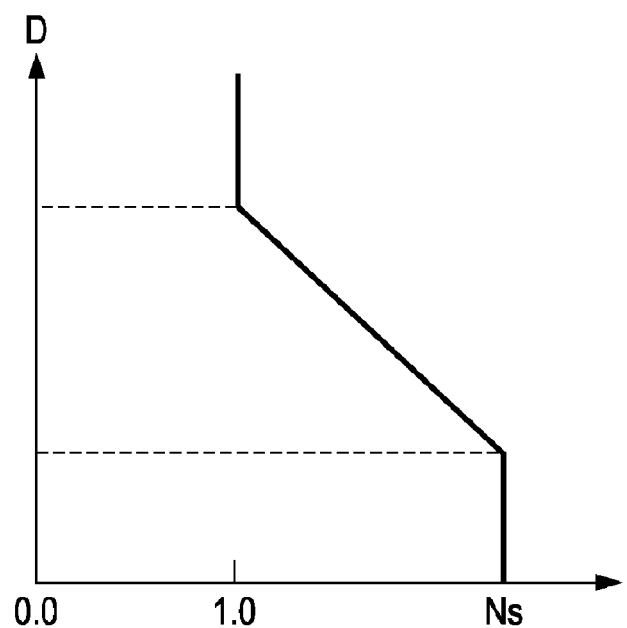
FIG. 17 illustrates a refractive index of a fine textured structure having a mean pitch shorter than the wavelength of visible light in a cross-sectional direction.

FIG. 17 schematically illustrates an effective refractive index of a cross section of the fine textured structure illustrated in FIG. 20. The vertical axis represents a thickness direction (height direction) of the fine textured structure. The horizontal axis represents the refractive index.

In the vertical axis, 0.0 represents the interface with the lens surface. D represents the thickness (height) of the textured configuration of the fine textured structure. Because the medium is dense in the interface with the optical surface and its vicinity (thickness zero area or its vicinity), the effective refractive index is high at Ns.

Figure 23:
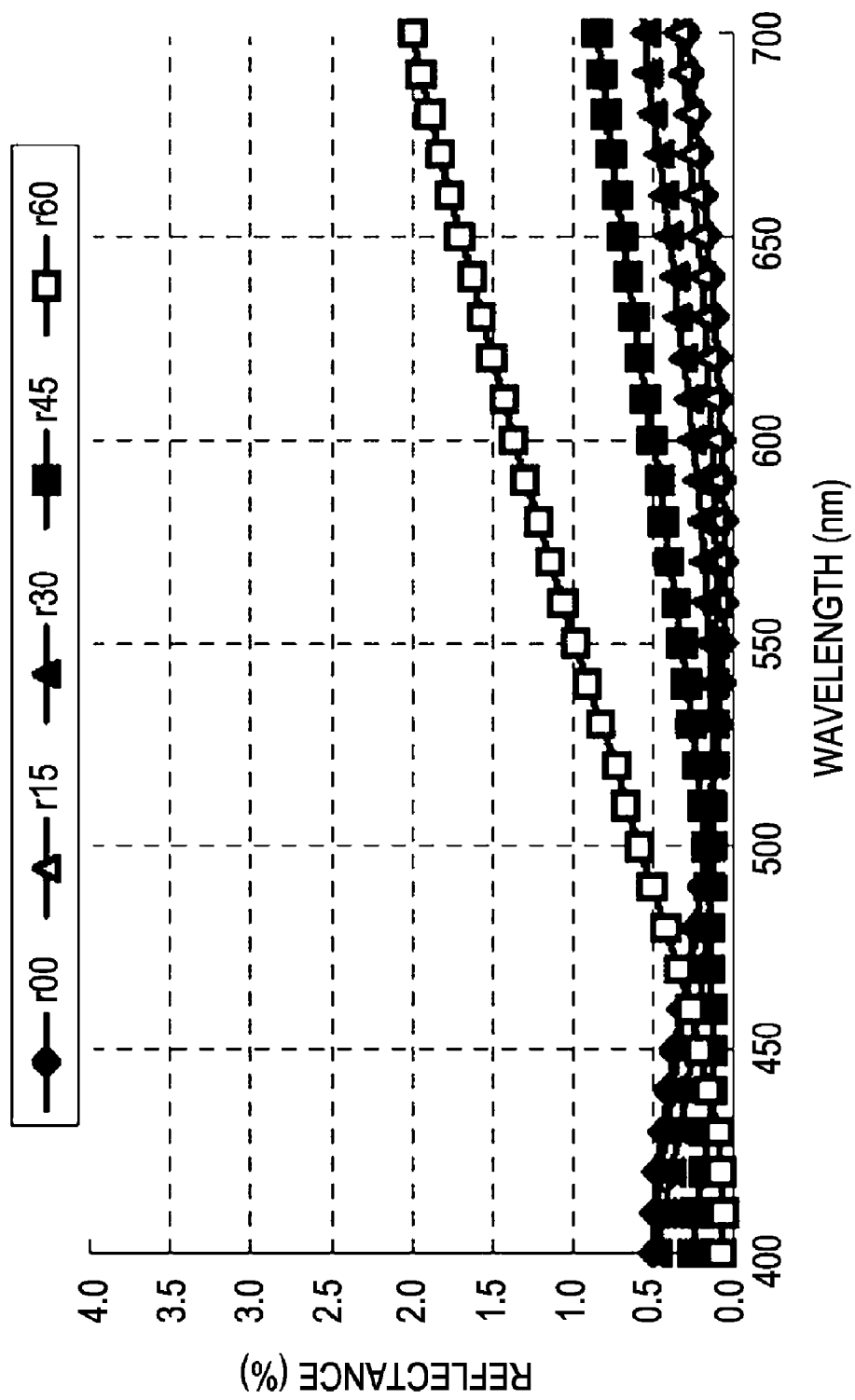
FIG. 23 is a graph of a spectral reflectance characteristic of a fine textured structure having a mean pitch shorter than the wavelength of visible light.
Figure 24:
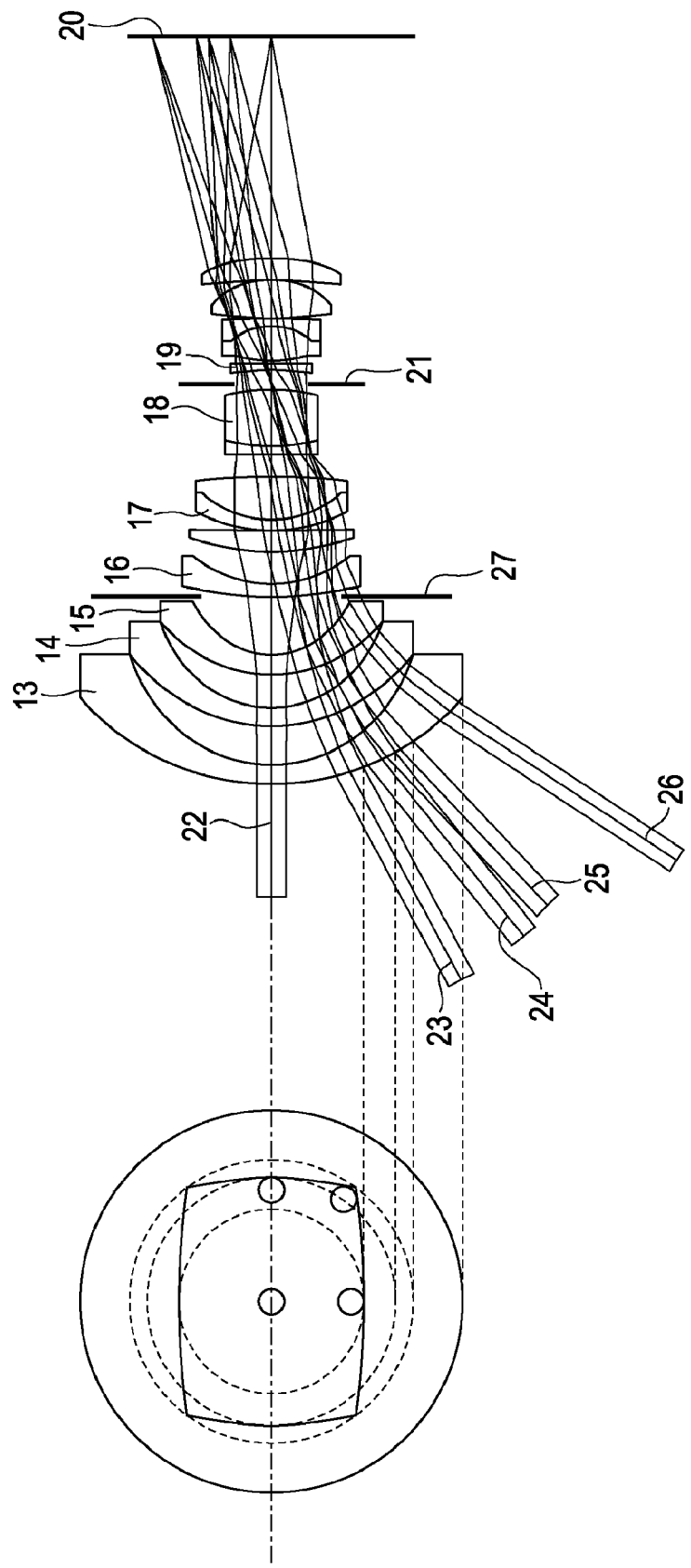
FIG. 24 illustrates a configuration of a known optical system.

In contrast, the effective refractive index decreases with distance from the interface. At the top end of the structure, the effective refractive index is one, which is approximately equivalent to that of the air. Therefore, the fine textured structure according to the present embodiment has a satisfactory antireflection structure with respect to visible light, as illustrated in the graph of spectral reflectance in FIG. 23.

Second Embodiment

Figure 3:
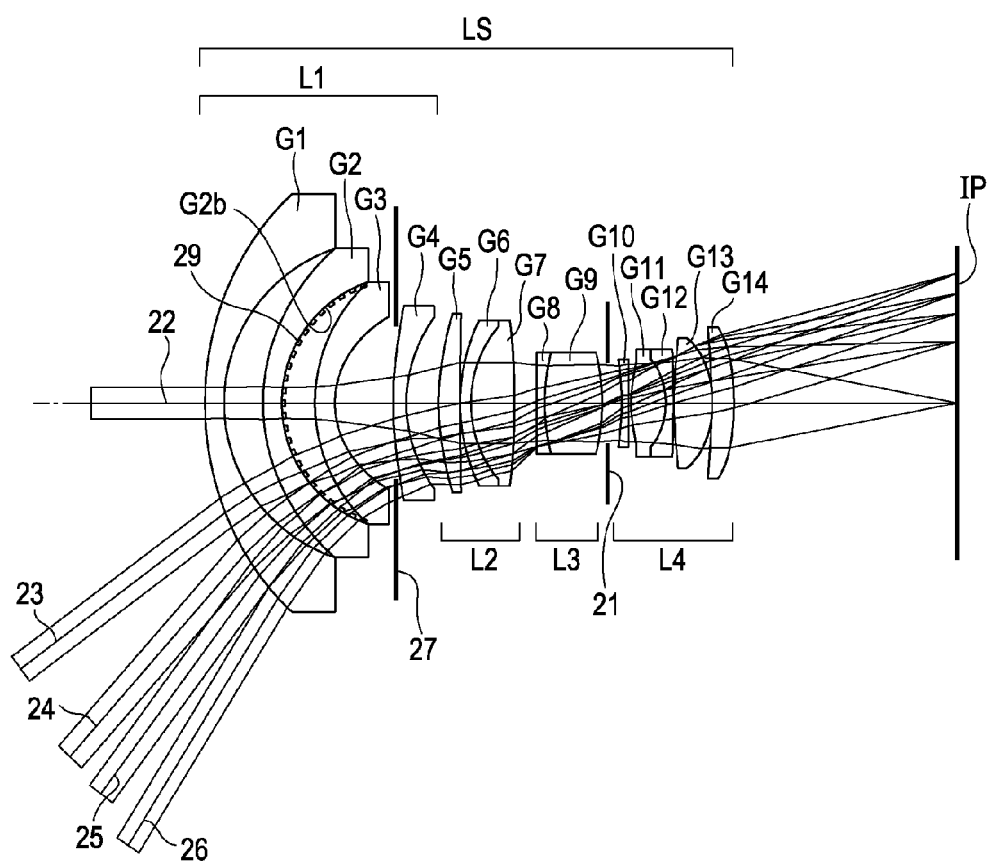
FIG. 3 illustrates a configuration of an optical system according to a second embodiment of the present invention.

FIG. 3 is a cross-sectional view of lens elements of an image pickup optical system for use in the image pickup apparatus according to a second embodiment of the present invention.

In the present embodiment, a flare-cut stop having a non-circular opening is disposed between the object and the aperture stop. An optical surface on which a fine textured structure is formed is disposed between the object and the flare-cut stop.

The image taking lens according to the second embodiment is a wide-angle lens that has a focal length of approximately 14 mm and an angle of view in image taking of 2ω=114°.

In FIG. 3, the image taking lens LS includes a first lens unit L1 to a fourth lens unit L4.

The first lens unit L1 has a negative refractive power and includes a first lens element G1, a second lens element G2, a third lens element G3, and a fourth lens element G4. The second lens unit L2 includes a fifth lens element G5 to a seventh lens element G7. The third lens unit L3 includes an eighth lens element G8 and a ninth lens element G9. The fourth lens unit L4 includes a 10th lens element G10 to a 14th lens element G14.

An image pickup surface of a solid-state image pickup element (image pickup unit), for example, a CCD sensor or a CMOS sensor, is disposed at an image plane IP. A variable stop 21 is arranged between the third lens unit L3 and the fourth lens unit L4.

A flare-cut stop 27 is disposed between the third lens element G3 and the fourth lens element G4.

A fine textured structure 29 is formed on an optical surface G2b of the second lens element G2. The optical surface G2b faces the image side. The fine textured structure 29 has a mean pitch shorter than the wavelength of visible light (400 nm to 700 nm).

The optical surface G2b of the second lens element G2 facing the image side is also referred to as the "fine textured surface G2b."

Light rays 22 (on-axis light rays) form an image at the center of an image height. Light rays 23, 24, 25, and 26 form images at image heights of 10 mm, 15 mm, 18 mm, and 21.635 mm, respectively.

The light rays widen with distance from the aperture stop 21 toward the object side. In particular, at the optical surface G2b, on which the fine textured structure 29 is formed, light rays corresponding to image heights are separated.

Figure 4:
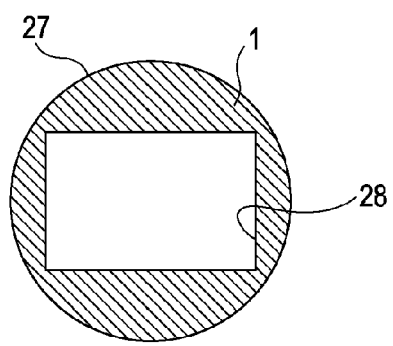
FIG. 4 is a schematic diagram of a special flare-cut stop according to the second embodiment.

FIG. 4 illustrates an opening shape of the flare-cut stop 27.

In FIG. 4, a range (opening) 28 is a range in which light rays forming an image at an image height corresponding to the image pickup range pass through the surface of the flare-cut stop 27. The other light rays are blocked by a shaded region 1. Thus, an entry of unnecessary light into the optical system at the image side from the flare-cut stop 27 is prevented.

It is difficult to prevent light rays from entering the unnecessary portion of the first lens element G1 to the third lens element G3, which are disposed between the flare-cut stop 27 and the object. To address this, the provision of the fine textured structure 29 with the second surface G2b of the second lens element G2, which is disposed between the flare-cut stop 27 and the object, can minimize the occurrence of flares and ghosts caused by unnecessary light.

The characteristics of the fine textured structure formed on the optical surface G2b are substantially the same as those in the first embodiment.

Third Embodiment

Figure 5:
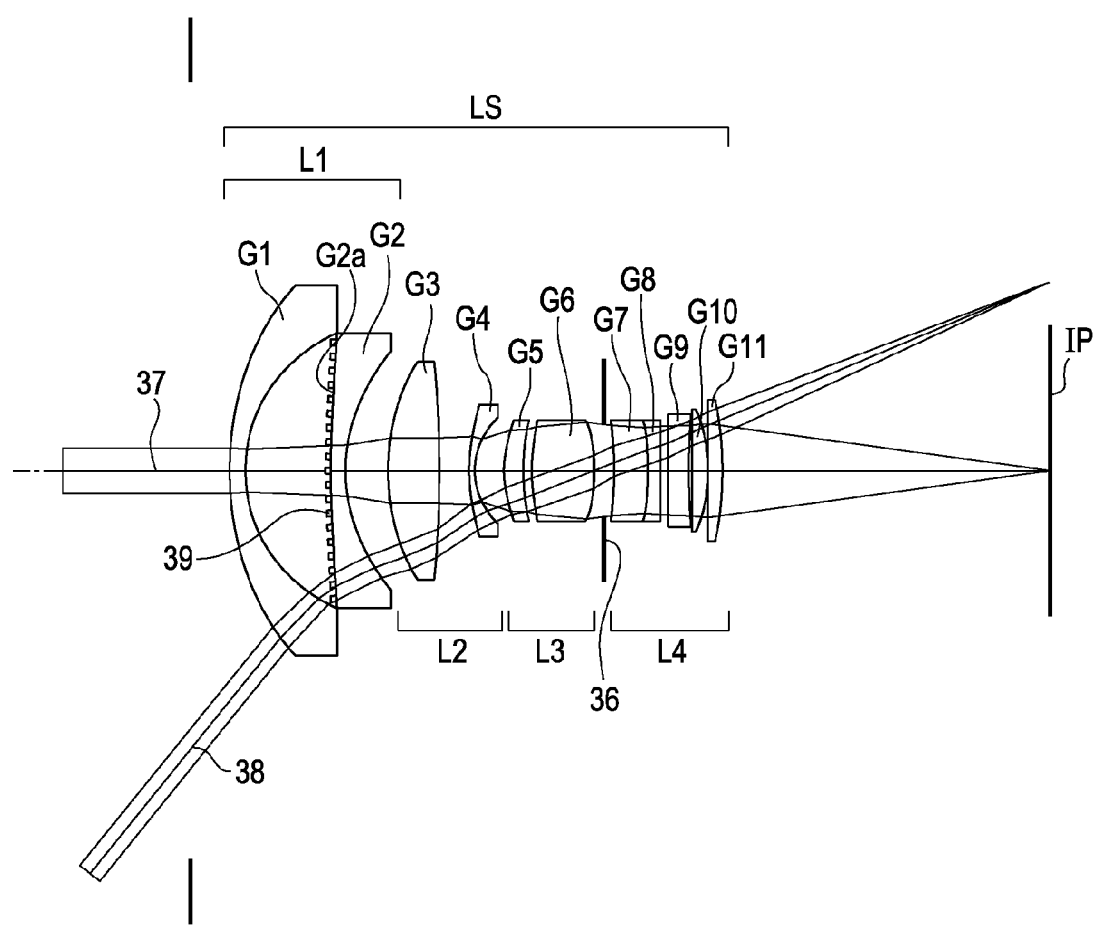
FIG. 5 illustrates a configuration of an optical system according to a third embodiment of the present invention.

FIG. 5 is a cross-sectional view of lens elements of an image pickup optical system (image taking lens) for use in the image pickup apparatus according to a third embodiment of the present invention.

The image pickup apparatus according to the present embodiment has the shifting capability. Both of the first and second image pickup ranges have a substantially rectangular shape. The possible amount of unilateral shifting in the short-side direction is s1. The possible amount of unilateral shifting in the long-side direction is s2. The first image pickup range has a short side of approximately (24+2×s1) mm and a long side of approximately (36+2×s2) mm. The second image pickup range has a short side of approximately 24 mm and a long side of approximately 36 mm.

At this time, the following conditions are satisfied.

$$5 < s1 < 20 \quad (5)$$

$$5 < s2 < 20 \quad (6)$$

The image taking lens according to the third embodiment has the shifting capability and tilting capability and is a wide-angle lens that has a focal length of approximately 24 mm and an angle of view in image taking of 2ω=84°.

In FIG. 5, the image taking lens LS includes a first lens unit L1 to a fourth lens unit L4.

The first lens unit L1 has a negative refractive power and includes a first lens element G1 and a second lens element G2. The second lens unit L2 includes a third lens element G3 and a fourth lens element G4. The third lens unit L3 includes a fifth lens element G5 and a sixth lens element G6. The fourth lens unit L4 includes a seventh lens element G7 to an 11th lens element G11.

An image pickup surface of a solid-state image pickup element (image pickup unit), for example, a CCD sensor or a CMOS sensor, is disposed at an image plane IP. A variable stop 36 is arranged between the third lens unit L3 and the fourth lens unit L4.

A fine textured structure 39 is formed on an optical surface G2a of the second lens element G2. The optical surface G2a faces the object side. The fine textured structure 39 has a mean pitch shorter than the wavelength of visible light (400 nm to 700 nm).

The optical surface G2a of the second lens element G2 facing the object side is also referred to as the "fine textured surface G2a." Reference numeral 37 represents on-axis light rays. Reference numeral 38 represents outermost off-axis light rays.

The light rays widen with distance from the variable stop 36 toward the object side. In particular, at the optical surface G2a, on which the fine textured structure 39 is formed, light rays corresponding to image heights are separated.

Figure 12:
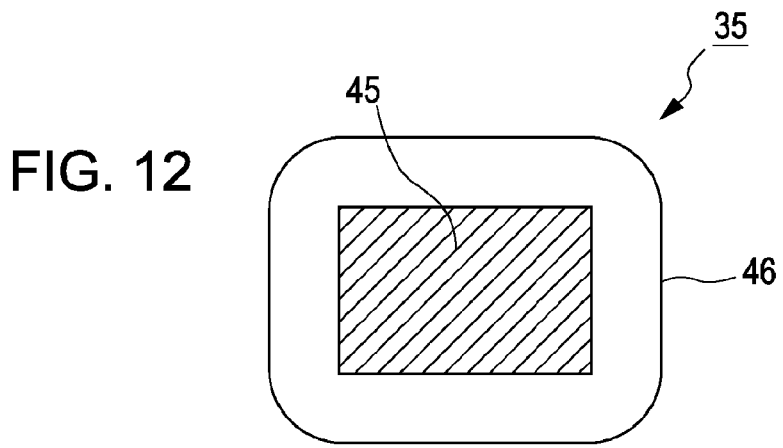
FIG. 12 is a schematic diagram that illustrates an image pickup range according to the third embodiment.

FIG. 12 is an illustration for describing an effective screen used in image taking using the image taking lens according to the third embodiment.

In FIG. 12, an image pickup range 45 has a size of approximately 24 mm×36 mm (full size). The image pickup range 45 corresponds to (the effective surface of) the image pickup element.

An image pickup range 46 is a range in which an extension having a width of approximately 10 mm is added to the full-size image pickup range so as to surround it.

The image taking lens according to the present embodiment is designed in consideration of image forming performance in the image pickup range 46 extended from the image pickup range 45. That is, the image taking lens has an image circle of approximately 31.6 mm (diagonal 21.6 mm+10 mm). Accordingly, although the focal length is approximately 24 mm, the image taking lens is a wide-angle lens that has an angle of view (2ω=105°) corresponding to 16 mm on a full-size basis.

The image taking lens has the shifting and tilting capabilities of enabling the optical axis of the lens to be translated (shifted) and tilted with respect to the main body of the camera.

Figure 6:
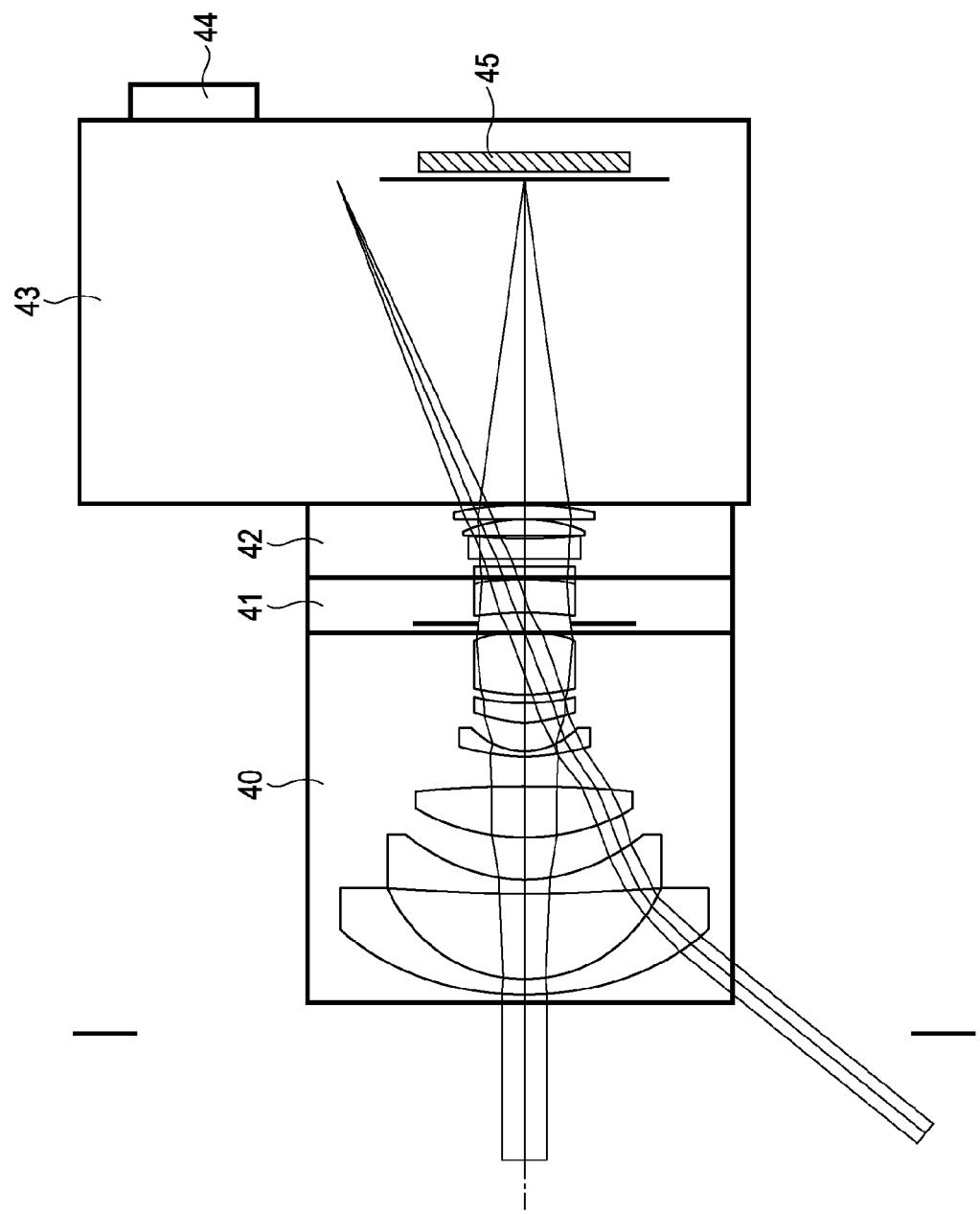
FIG. 6 is a schematic diagram that illustrates a shifting structure of a lens barrel according to the third embodiment.

FIG. 6 is a schematic diagram for describing the shifting mechanism of the image taking lens according to the third embodiment. In FIG. 6, a lens barrel 40 is fixed at a movable shifting mechanism 41.

The first to third lens units L1 to L3 serve as a shift lens. A fixed shifting mechanism 42 is fixed at a camera main body 43 with a mount (not shown) disposed therebetween. An image pickup element 45 is arranged inside the camera main body 43. A finder system for use in observing an object image (finder image) formed on a focusing screen (not shown) arranged at a position optically conjugate with the image pickup element 45. The finder system contains an eyepiece portion 44. The relative positional relationship between the image pickup surface and the focusing screen is fixed.

Figure 7:
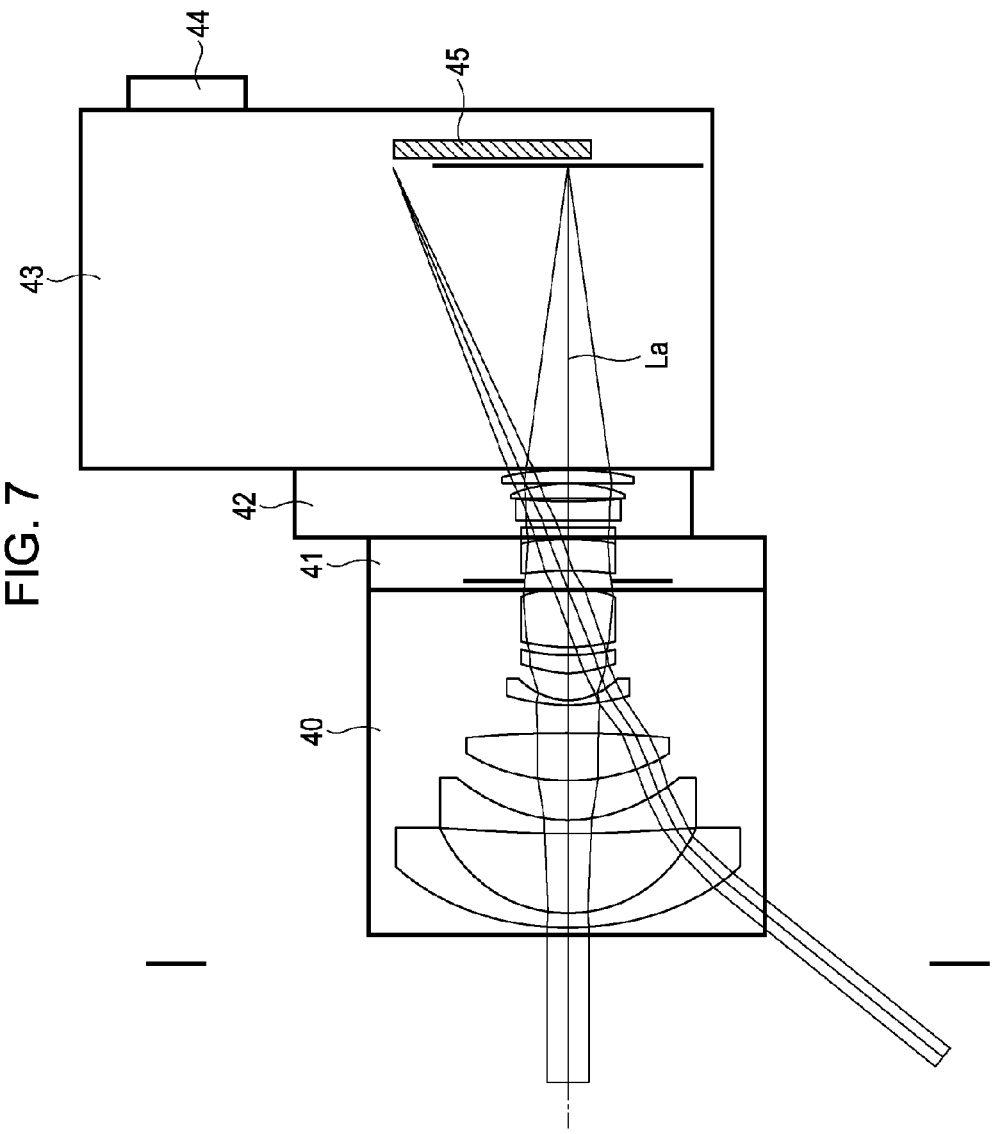
FIG. 7 is a schematic diagram that illustrates a state where the lens barrel according to the third embodiment is shifted downward.

FIG. 7 is a schematic diagram that illustrates a state where the shift lens units L1, L2, and L3 illustrated in FIG. 6 are shifted downward.

When the movable shifting mechanism 41 is slid downward with respect to the fixed shifting mechanism 42, the image taking lens is thus relatively shifted downward with respect to the camera main body 43.

Figure 13:
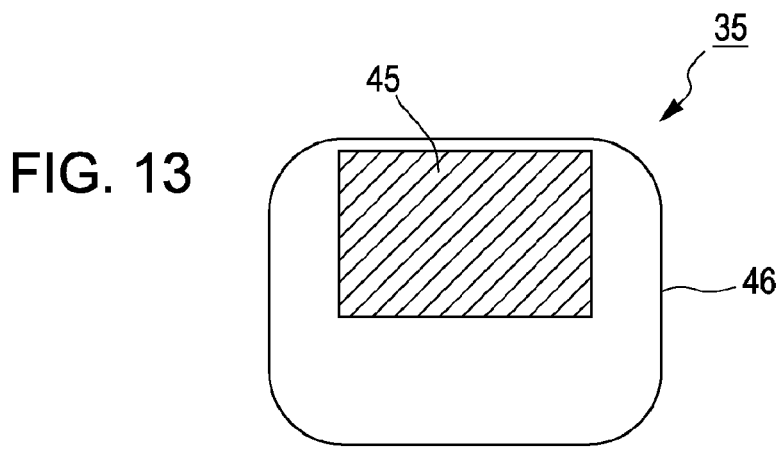
FIG. 13 is a schematic diagram that illustrates the image pickup range in a downwardly shifted state according to the third embodiment.

Before shifting, an optical axis La of the image taking lens coincides with the center of the image pickup element 45. The shifting moves the optical axis La of the image taking lens to the lower part of the image pickup element 45. As illustrated in FIG. 13, the position of the image pickup element 45 is shifted upward with respect to the image pickup range 46 of the image taking lens.

Figure 8:
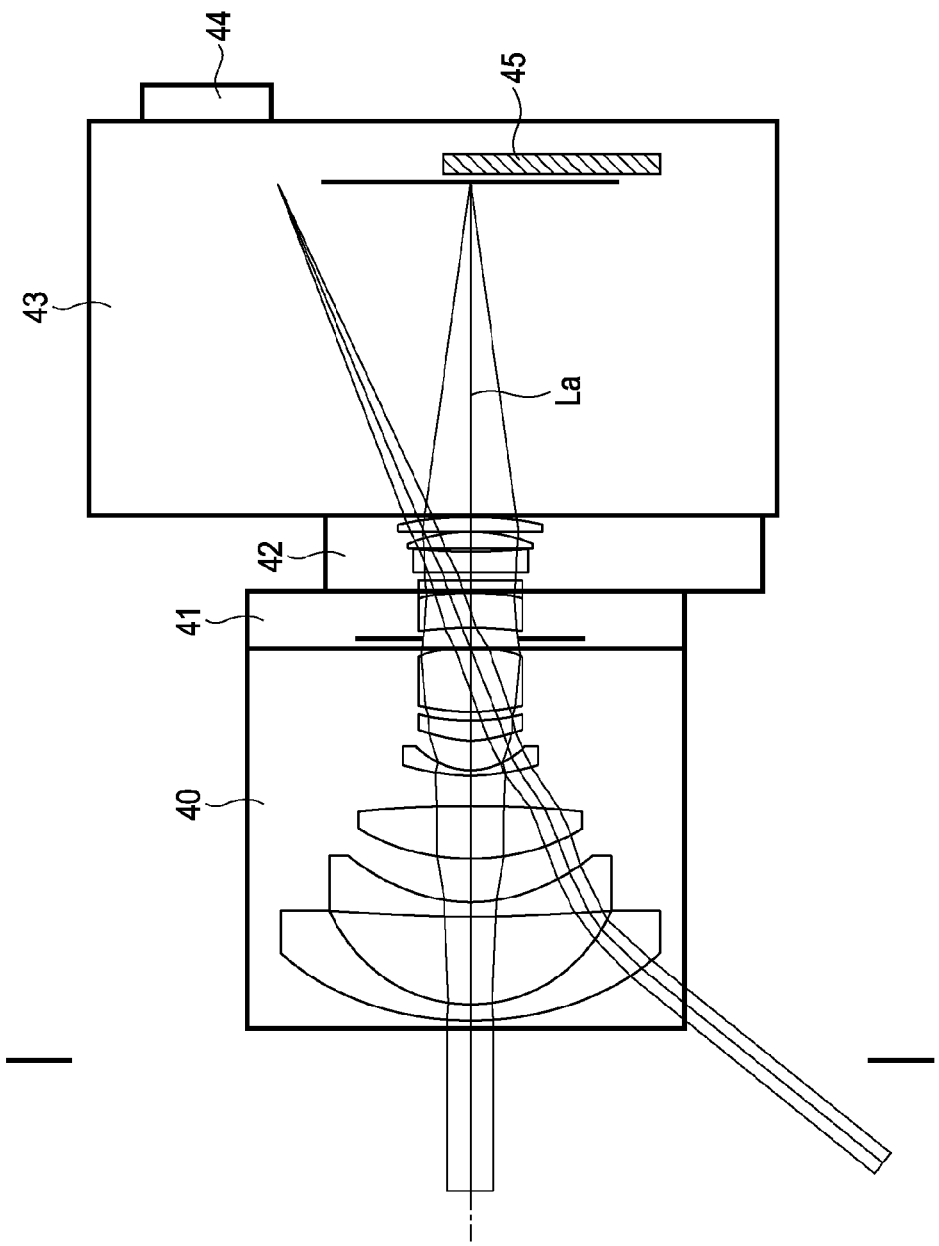
FIG. 8 is a schematic diagram that illustrates a state where the lens barrel according to the third embodiment is shifted upward.

FIG. 8 is a schematic diagram that illustrates a state where the shift lens units L1, L2, and L3 illustrated in FIG. 6 are shifted upward.

When the movable shifting mechanism 41 is slid upward with respect to the fixed shifting mechanism 42, the image taking lens is thus relatively shifted upward with respect to the camera main body 43.

Figure 14:
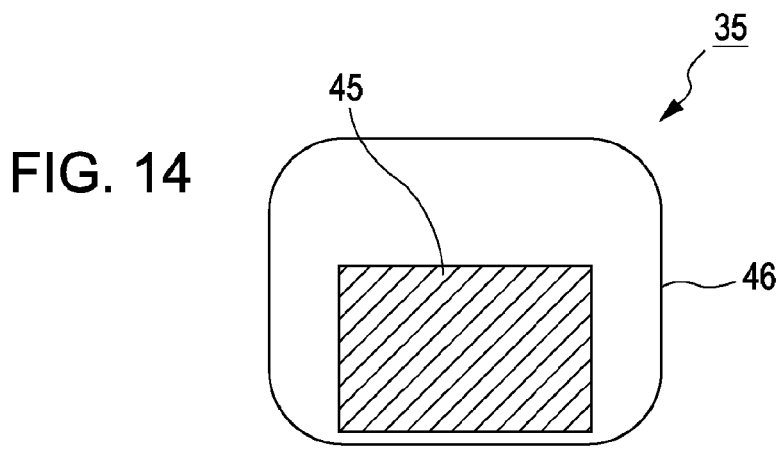
FIG. 14 is a schematic diagram that illustrates the image pickup range in an upwardly shifted state according to the third embodiment.

Before shifting, the optical axis La of the image taking lens coincides with the center of the image pickup element 45. The shifting moves the optical axis La of the image taking lens to the upper part of the image pickup element 45. As illustrated in FIG. 14, the position of the image pickup element 45 is shifted downward with respect to the image pickup range 46 of the image taking lens.

The amount of movement on the image pickup element 45 coincides with the amount of shifting of the image taking lens. For the image taking lens according to the third embodiment, the extended image pickup range having a width of approximately 10 mm added to top and bottom, left and right allows the image taking lens to be shifted up to approximately 10 mm.

Figure 9:
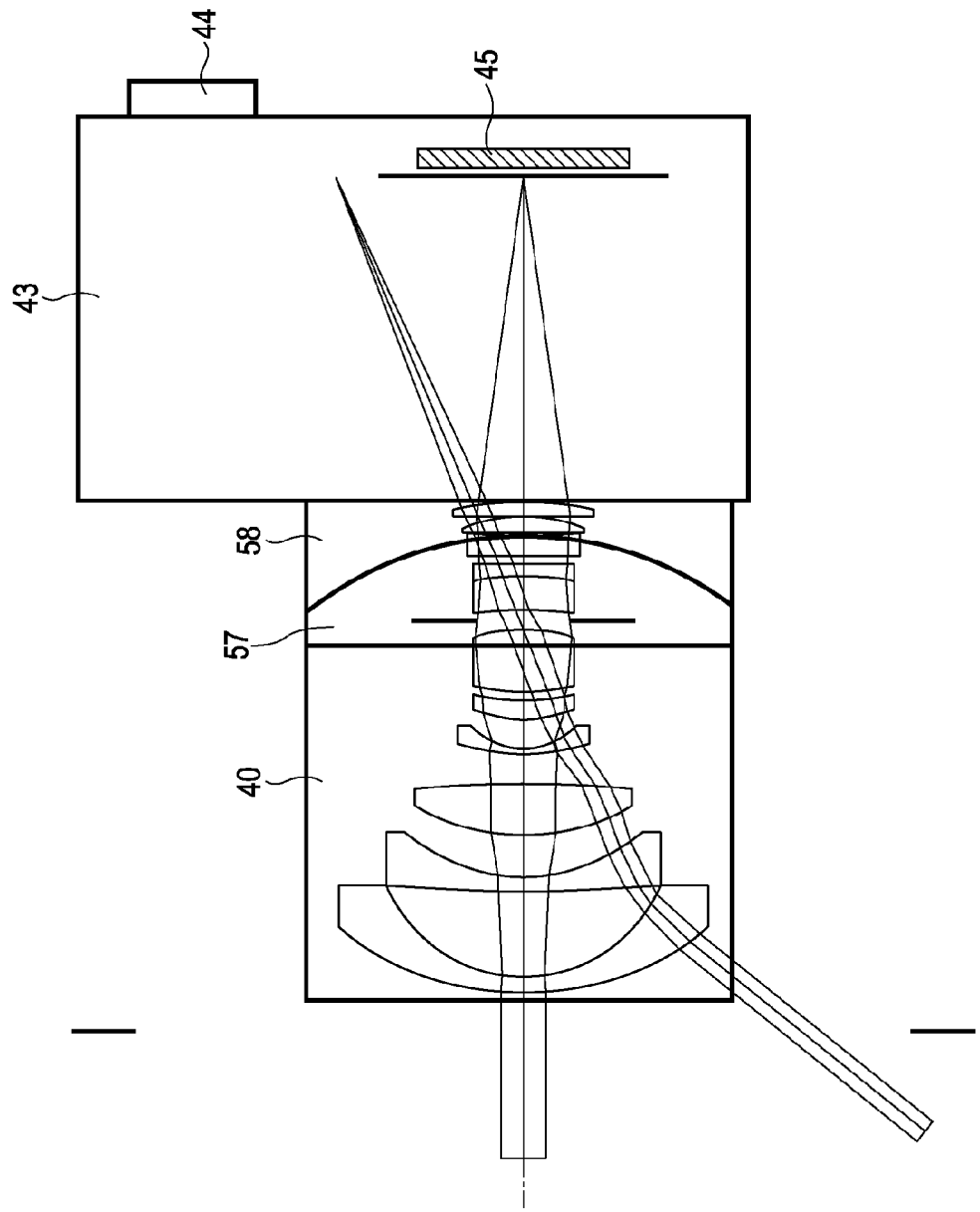
FIG. 9 is a schematic diagram that illustrates a tilting structure of the lens barrel according to the third embodiment.

FIG. 9 is a schematic diagram for describing the tilting mechanism of the image taking lens according to the third embodiment.

In FIG. 9, the lens barrel 40 is fixed at a movable tilting mechanism 57. A fixed tilting mechanism 58 is fixed at the camera main body 43 with a mount (not shown) disposed therebetween. The image pickup element 45 is fixed inside the camera main body 43. A finder system for use in observing a focusing screen (not shown) arranged at a position optically conjugate with the image pickup element 45.

The eyepiece portion 44 is contained in the finder system. The relative positional relationship between the image pickup surface and the focusing screen is fixed.

Figure 10:
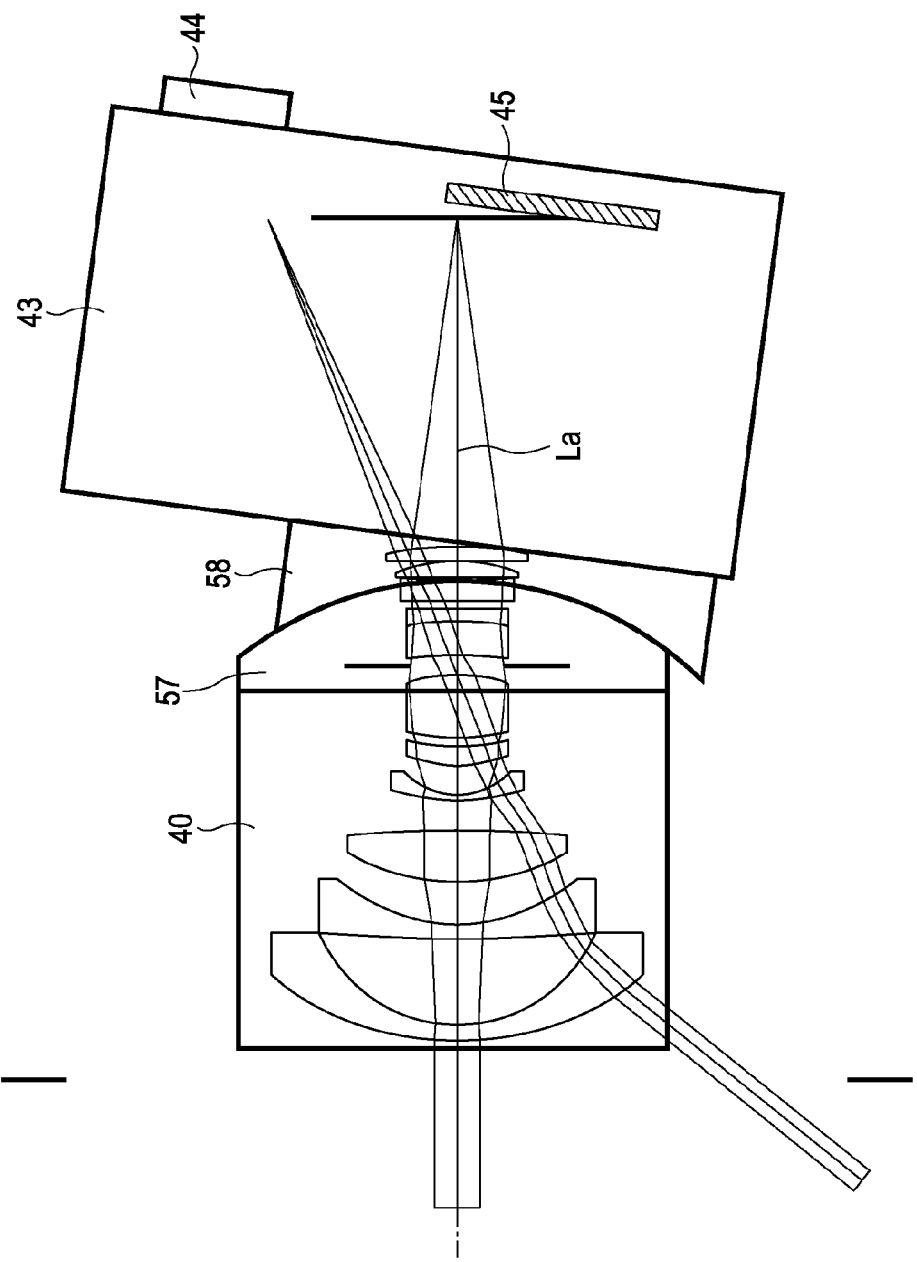
FIG. 10 is a schematic diagram that illustrates a state where the lens barrel according to the third embodiment is tilted downward.

FIG. 10 is a schematic diagram that illustrates a state where the tilt lens units L1, L2, and L3 illustrated in FIG. 9 are tilted downward.

When the movable tilting mechanism 57 is rotated downward with respect to the fixed tilting mechanism 58, the image taking lens is thus relatively tilted downward with respect to the camera main body 43.

Before tilting, the optical axis La of the image taking lens coincides with the center of the image pickup element 45. The tilting moves the optical axis La of the image taking lens to the lower part of the image pickup element 45. The amount of movement of the optical axis La on the image pickup element 45 varies with a change in the position of the center of rotation of the tilting mechanism.

Normally, the center of rotation is in the vicinity of the principal point of the image taking lens at the image side. If the center of rotation is displaced to the object side, the amount of movement is increased.

Figure 15:
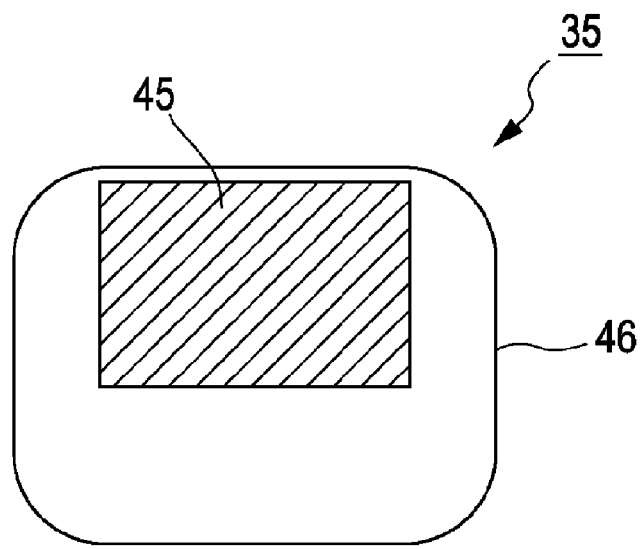
FIG. 15 is a schematic diagram that illustrates the image pickup range in a downwardly tilted state according to the third embodiment.

In the present embodiment, the center of rotation of the tilting mechanism is arranged between the object and the principal point at the image side. As illustrated in FIG. 15, the image pickup element 45 is significantly shifted upward with respect to the image pickup range 46.

Figure 11:
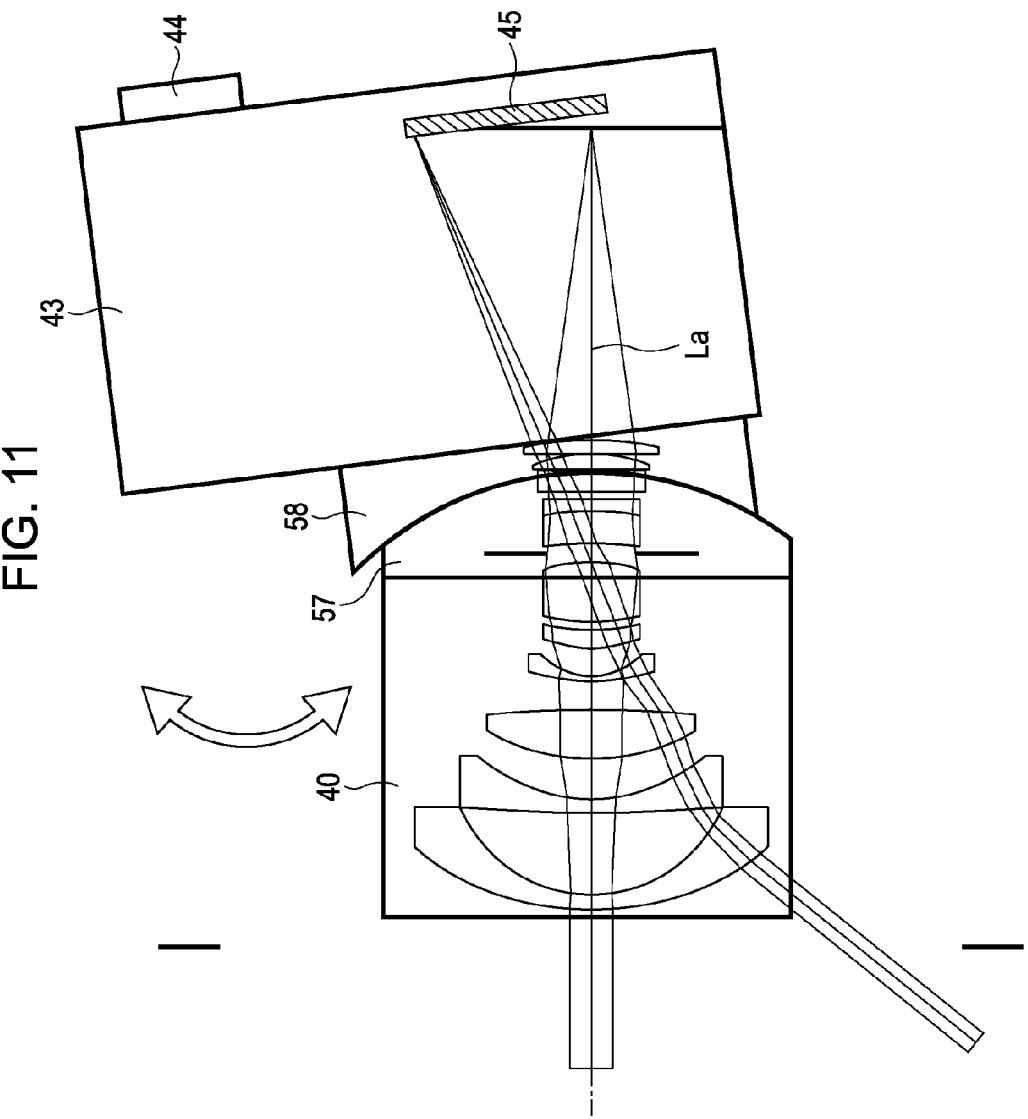
FIG. 11 is a schematic diagram that illustrates a state where the lens barrel according to the third embodiment is tilted upward.

FIG. 11 is a schematic diagram that illustrates a state where the tilt lens units L1, L2, and L3 illustrated in FIG. 9 are tilted upward.

When the movable tilting mechanism 57 is rotated upward with respect to the fixed tilting mechanism 58, the image taking lens is thus relatively tilted upward with respect to the camera main body 43.

The tilting moves the optical axis La of the image taking lens to the lower part of the image pickup element 45. In the present embodiment, the center of rotation of the tilting mechanism is arranged between the object and the principal point at the image side, as in the case of the downward tilting.

Figure 16:
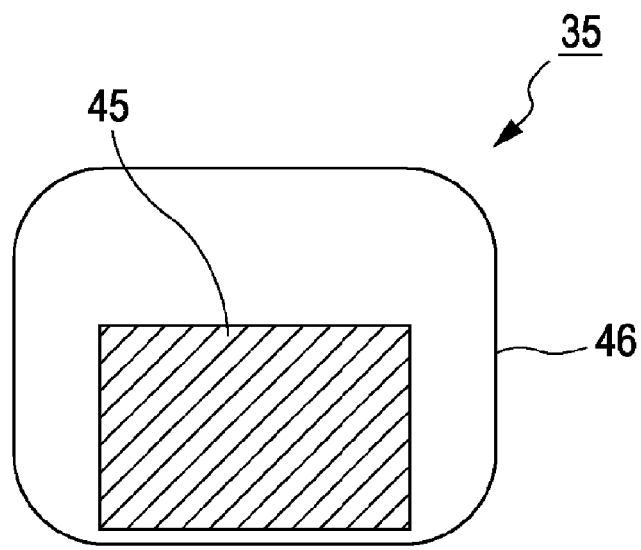
FIG. 16 is a schematic diagram that illustrates the image pickup range in an upwardly tilted state according to the third embodiment.

As illustrated in FIG. 16, the image pickup element 45 is significantly shifted downward with respect to the image pickup range 46 of the image taking lens.

As described above, the image taking lens according to the present embodiment has the image pickup range 46 larger than the image pickup element 45. In the image pickup range 46 illustrated in FIGS. 12 to 16, light entering the region other than the image pickup element 45 is unnecessary, so this unnecessary light results in the occurrence of flares and ghosts.

A used region in the image pickup range 46 varies with the state of shifting or tilting, so it is difficult to block unnecessary light rays.

In the present embodiment, the provision of a fine textured structure with a lens surface of a portion of the image taking lens can minimize the occurrence of flares and ghosts caused by unnecessary light.

The fine textured structure 39 formed on the optical surface G2a is substantially the same as that in the first embodiment.

The values of the conditional expression (1) with respect to the embodiments are shown in Table 1.

Figure 25:
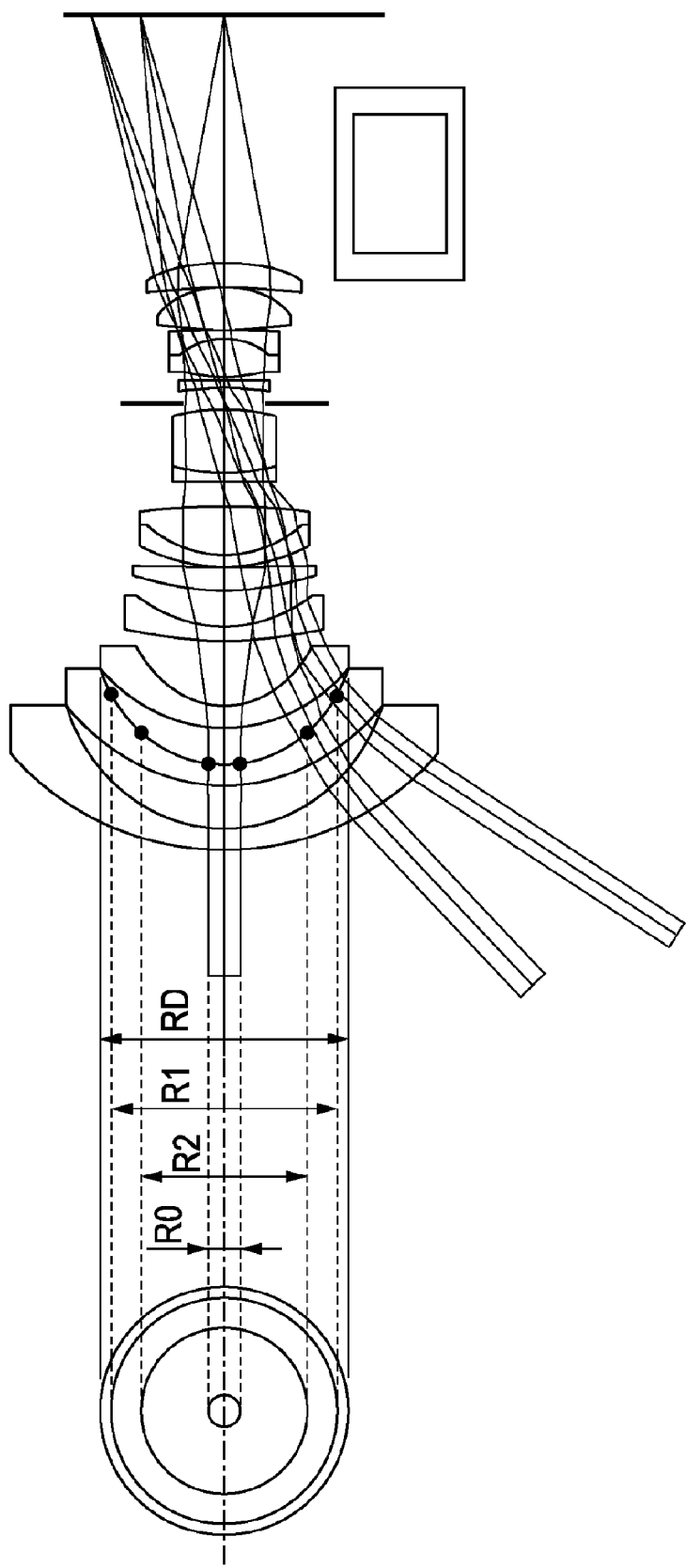
FIG. 25 illustrates a configuration of the optical system according to the second embodiment.

FIG. 25 is an illustration for describing how light rays pass through the optical surface G2b on which the fine textured structure 29 is formed in the image taking lens illustrated in FIG. 3. RD represents the effective diameter of the optical surface G2b having the fine textured structure. R0 represents the diameter of a region where light rays corresponding to the center of an image height pass through the optical surface G2b. The larger the value R0 is, the more the light rays are separated. It is advantageous to use the fine textured structure 29 when the left-hand side is larger than the lower limit, that is, in the optical surface in which light rays are more separated.

Table 2 shows the values of the conditional expression (3) according to the first and third embodiments.

This conditional expression determines the proportion of the region through which unnecessary light passes with respect to the diameter R0 of light rays corresponding to the center of an image height in the surface having a fine textured structure having a mean pitch shorter than a wavelength of visible light (the region outside R2 and inside R1), as illustrated in FIG. 25.

If the left-hand side of this expression exceeds the lower limit, there is a possibility that more unnecessary light is contained. Therefore, it can be useful that a fine textured structure having a mean pitch shorter than a wavelength of visible light be provided to such an optical surface.

Figure 18:
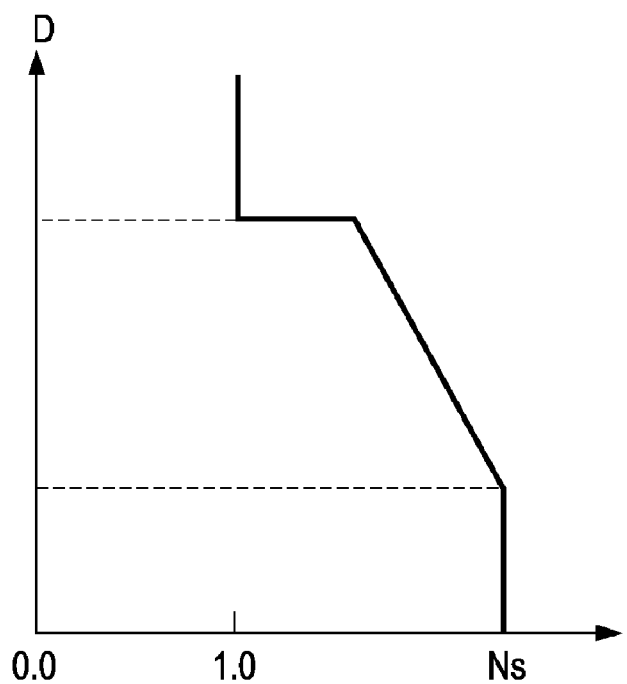
FIG. 18 illustrates a refractive index of a fine textured structure having a mean pitch shorter than the wavelength of visible light in a cross-sectional direction.
Figure 19:
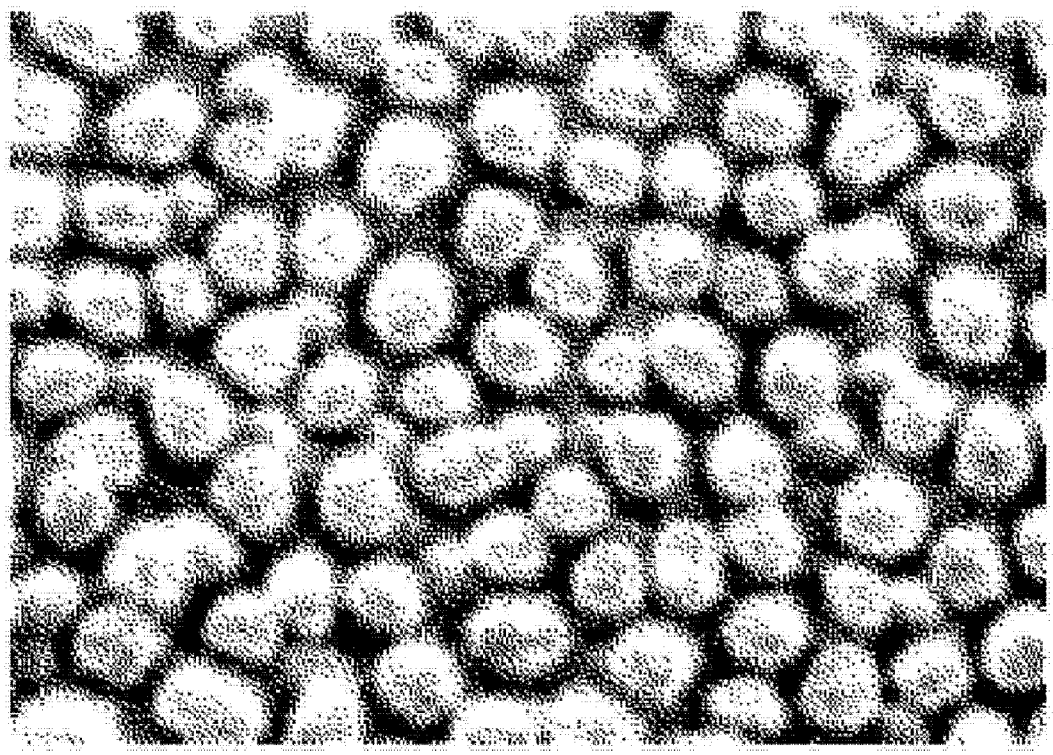
FIG. 19 illustrates a scanning electron microscope (SEM) photograph of a fine textured structure having a mean pitch shorter than the wavelength of visible light from an interface.

One example of the fine textured structure having a mean pitch shorter than a wavelength of visible light according to the first to third embodiments may be a textured structure illustrated in a SEM photograph of FIG. 19. The effective refractive index of a cross section of that example structure is schematically illustrated in FIG. 18. Because the textured structure has upward projections, the medium is denser and the effective refractive index is also higher in the vicinity of the interface with the optical surface. The thickness of the projections decreases with distance from the interface, so the effective refractive index is also lower. Accordingly, with respect to the visible light, satisfactory antireflection performance substantially the same as the fine textured structure having a mean pitch shorter than a wavelength of visible light illustrated in FIGS. 20 and 21 is obtainable.

Numerical examples 1 to 3 of the image pickup optical system according to the present invention are described below.

The relationship between the above-described conditional expressions (1) and (3) and the numerical examples 1 to 3 are illustrated in Tables 1 and 2.

In the numerical examples, i represents the order of an optical surface counting from the object side, ri(Ri) represents the radius of curvature of an i-th lens surface from the object side in sequence, di(Di) represents the thickness and air gap of an i-th lens from the object side in sequence, and ni(Ni) and vi represent the refractive index and the Abbe number of the material of an i-th lens from the object side in sequence with respect to the d-line, respectively. The relationship between the above-described conditional expressions and the numerical examples are shown in Table 1.

The aspherical surface shape is represented by the following expression:

$$X = \frac{(1/R)H^2}{1+\sqrt{1-(1+K)(H/R)^2}} + AH^2 + BH^4 + CH^6 + DH^8 + EH^{10}$$

where the optical axis direction is the X-axis, the direction substantially perpendicular to the optical axis is the H-axis, the direction in which light travels is positive, R represents the paraxial radius of curvature, and A, B, C, D, and E represent aspherical coefficients.

In the values of the aspherical coefficients, for example, "D-Z" and "e-Z" mean "$10^{-z}$."

Numerical Example 1

| f = 14.3 fno = 1:2.89 2ω = 113° | | | |
|---|---|---|---|
| r1 = 43.611 | d1 = 3.10 | n1 = 1.69680 | ν1 = 55.5 |
| r2 = 26.108 | d2 = 11.30 | n2 = 1.60311 | ν2 = 60.7 |
| *r3 = 58.696 | d3 = 5.83 | n3 = 1.69680 | ν3 = 55.5 |
| r4 = 52.318 | d4 = 0.15 | n4 = 1.77250 | ν4 = 49.6 |
| r5 = 36.653 | d5 = 1.70 | n5 = 1.69680 | ν5 = 55.5 |
| r6 = 17.777 | d6 = 6.39 | n6 = 1.59551 | ν6 = 39.2 |
| r7 = 48.633 | d7 = 1.30 | n7 = 1.56732 | ν7 = 42.8 |
| r8 = 20.569 | d8 = 8.24 | n8 = 1.77250 | ν8 = 49.6 |
| r9 = 260.012 | d9 = 1.50 | n9 = 1.77250 | ν9 = 49.6 |
| r10 = 15.580 | d10 = 10.11 | n10 = 1.60311 | ν10 = 60.7 |
| r11 = −50.458 | d11 = 3.24 | n11 = 1.74320 | ν11 = 49.3 |
| r12 = 54.936 | d12 = 8.21 | n12 = 1.92286 | ν12 = 21.3 |
| r13 = −10.586 | d13 = 1.50 | n13 = 1.48749 | ν13 = 70.2 |
| r14 = −14.355 | d14 = 0.82 | n14 = 1.80400 | ν14 = 46.6 |
| r15 = −14.991 | d15 = 0.90 | | |
| r16 = −42.782 | d16 = 0.50 | | |
| r17 = (STOP) | d17 = 1.40 | | |
| r18 = 84.663 | d18 = 8.63 | | |
| r19 = −69.334 | d19 = 4.00 | | |
| r20 = 78.755 | d20 = 0.67 | | |
| r21 = −180.599 | d21 = 0.80 | | |
| r22 = 32.151 | d22 = 5.88 | | |
| r23 = −18.364 | d23 = 0.15 | | |
| r24 = 352.989 | d24 = 3.30 | | |
| r25 = −38.634 | | | |

| f = 14.3 | $|f_1|/f = 1.7$ |
|---|---|
| $f_1$ = −24.3 | $|f_1|/f_2 = 0.81$ |
| $f_2$ = 30.0 | |
| A = 0, B = 9.5 | |
| A = 0, B = 9.53227D-06, C = 2.86527D-09, D = −1.05830D-11, E = 2.10187D-14 | |

Numerical Example 2

| f = 14.16 Fno = 2.90 2ω = 113.6° | | | |
|---|---|---|---|
| R1 = 45.690 | D1 = 3.80 | N1 = 1.712995 | ν1 = 53.9 |
| R2 = 26.931 | D2 = 7.84 | N2 = 1.772499 | ν2 = 49.6 |
| R3 = 33.314 | D3 = 3.30 | N3 = 1.583126 | ν3 = 59.4 |
| R4 = 19.874 | D4 = 5.61 | N4 = 1.804000 | ν4 = 46.6 |
| R5 = 23.495 | D5 = 3.35 | N5 = 1.749500 | ν5 = 35.3 |
| *R6 = 10.875 | D6 = 10.25 | N6 = 1.804000 | ν6 = 46.6 |
| R7 = 61.128 | D7 = 2.24 | N7 = 1.749500 | ν7 = 35.3 |
| R8 = 22.520 | D8 = 5.31 | N8 = 1.804000 | ν8 = 46.6 |
| R9 = 42.006 | D9 = 3.54 | N9 = 1.516330 | ν9 = 64.1 |
| R10 = 509.044 | D10 = 0.15 | N10 = 1.804000 | ν10 = 46.6 |
| R11 = 31.356 | D11 = 1.80 | N11 = 1.496999 | ν11 = 81.5 |
| R12 = 17.781 | D12 = 7.83 | N12 = 1.834807 | ν12 = 42.7 |
| R13 = −86.755 | D13 = 3.41 | N13 = 1.496999 | ν13 = 81.5 |
| R14 = −289.782 | D14 = 1.30 | N14 = 1.583126 | ν14 = 59.4 |
| R15 = 22.591 | D15 = 10.39 | | |
| R16 = −27.090 | D16 = 1.24 | | |
| R17 = STOP | D17 = 2.41 | | |
| R18 = −37.895 | D18 = 1.20 | | |
| R19 = 145.437 | D19 = 0.55 | | |
| R20 = 34.767 | D20 = 5.67 | | |
| R21 = −10.397 | D21 = 1.30 | | |
| R22 = −458.375 | D22 = 0.15 | | |
| R23 = 75.715 | D23 = 6.55 | | |
| R24 = −14.865 | D24 = 0.15 | | |
| *R25 = −113.026 | D25 = 3.65 | | |
| R26 = −31.039 | D26 = 40.64 | | |

Aspherical Coefficients

6TH SURFACE: k=−6.80017e-01 B=−1.30553e-05 C=−9.17021e-08 D=1.38835e-10 E=−1.64099e-12

25TH SURFACE: k=0.00000e+00 B=−2.57756e-05 C=−2.17167e-09 D=−3.83490e-10

Numerical Example 3

| F = 24.5 FNO = 1:3.5 2ω = 100° | | | |
|---|---|---|---|
| R1 = 58.33 | D1 = 2.30 | N1 = 1.58913 | ν1 = 61.2 |
| R2 = 23.57 | D2 = 13.18 | N2 = 1.58913 | ν2 = 61.2 |
| R3 = 350.92 | D3 = 2.20 | N3 = 1.53256 | ν3 = 45.9 |
| R4 = 27.61 | D4 = 6.56 | N4 = 1.71299 | ν4 = 53.8 |
| R5 = 31.64 | D5 = 8.05 | N5 = 1.80518 | ν5 = 25.4 |
| R6 = −224.93 | D6 = VARIABLE | N6 = 1.53172 | ν6 = 25.4 |
| R7 = 31.43 | D7 = 1.00 | N7 = 1.70225 | ν7 = 40.9 |
| R8 = 11.95 | D8 = 4.37 | N8 = 1.80518 | ν8 = 25.4 |
| R9 = 20.35 | D9 = 2.94 | N9 = 1.80518 | ν9 = 49.6 |
| R10 = 25.51 | D10 = 1.42 | N10 = 1.69680 | ν10 = 55.5 |
| R11 = 35.47 | D11 = 9.76 | N11 = 1.69680 | ν11 = 55.5 |
| R12 = −23.64 | D12 = 2.8 (STOP) | | |
| R13 = −107.79 | D13 = 5.49 | | |
| R14 = −37.70 | D14 = 1.95 | | |
| R15 = 294.85 | D15 = 1.13 | | |
| R16 = −100.09 | D16 = 3.04 | | |
| R17 = 71.04 | D17 = 0.72 | | |
| R18 = −81.83 | D18 = 2.46 | | |
| R19 = −19.63 | D19 = 0.15 | | |
| R20 = −270.78 | D20 = 1.95 | | |
| R21 = −51.38 | | | |

D6: 4.5(OBJECT∞)

The 1St Surface is Aspherical.

Aspherical Coefficients

A=0

B=$3.3 \times 10^{-6}$

C=$-9.2 \times 10^{-11}$

D=$2.8 \times 10^{-13}$

E=$7.0 \times 10^{-16}$

TABLE 1

|  | 1st Embodiment | 2nd Embodiment | 3rd Embodiment |
| --- | --- | --- | --- |
| RD | 49.29 | 38.20 | 31.32 |
| R0 | 4.84 | 4.97 | 8.47 |
| Conditional Expression (1) | 10.2 | 7.68 | 3.70 |

TABLE 2

|  | 1st Embodiment | 3rd Embodiment |
| --- | --- | --- |
| R0 | 4.84 | 8.47 |
| R1 | 47.8 | 29.7 |
| R2 | 38.6 | 21.4 |
| Conditional Expression (3) | 34.1 | 5.9 |

As described above, with the embodiments of the present invention, in the image taking lens having the shifting and tilting mechanism, even if a lens hood or flare-cut stop cannot be used because different image circles are used, the occurrence of flares and ghosts caused by unnecessary light can be minimized.

In particular, the occurrence of ghosts can be effectively reduced when an image taking lens shared by a film camera and a digital camera or in an interchangeable image taking lens for use in a digital single-lens reflex camera that can be used commonly in formats having different image circles is employed.

In an image pickup apparatus that has the capability of shifting or tilting the optical axis of an image taking lens with respect to the optical axis of a camera mount, the occurrence of ghosts can be effectively reduced.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2009-198414 filed Aug. 28, 2009 and No. 2008-236316 filed Sep. 16, 2008, which are hereby incorporated by reference herein in their entirety.

What is claimed is:

1. An image pickup apparatus comprising:
   an image pickup optical system including an optical element having optical incident and optical emergent surfaces and a fine textured structure having a mean pitch shorter than a wavelength of visible light, the fine textured structure being formed on at least one of the optical incident and optical emergent surfaces, the optical element being disposed between an aperture stop and an object; and
   an image pickup unit configured to receive an image formed by the image pickup optical system,
   wherein the following condition is satisfied:

$$\frac{R1^2 - R2^2}{R0^2} > 5$$

where, in a first image pickup range as an effective range of the image pickup unit and in a second image pickup range smaller than the first image pickup range, R1 is an effective diameter determined by a height when, among light rays forming an image at a maximum off-axis image height in the first image pickup range, a light ray that passes through a center of the aperture stop passes through the optical surface on which the fine textured structure is formed, R2 is an effective diameter determined by a height when, among light rays forming an image at a maximum off-axis image height in the second image pickup range, a light ray that passes through the center of the aperture stop passes through the optical surface on which the fine textured structure is formed, and R0 is a diameter when light rays forming an image on an optical axis pass through the optical surface on which the fine textured structure is formed.

2. The image pickup apparatus according to claim 1, wherein when the first image pickup range has a short side of approximately 24 mm and a long side of approximately 36 mm and the second image pickup range has a short side of approximately 24×k mm and a long side of approximately 36×k mm, the following condition is satisfied:

$0.3<k<0.8$.

3. The image pickup apparatus according to claim 1, wherein the image pickup apparatus has a shifting capability, each of the first and second image pickup ranges is substantially rectangular, and
   when s1 is a possible amount of unilateral shifting in a short-side direction, s2 is a possible amount of unilateral shifting in a long-side direction, the first image pickup range has a short side of approximately (24+2×s1) mm and a long side of approximately (36+2×s2) mm, and the second image pickup range has a short side of approximately 24 mm and a long side of approximately 36 mm, the following conditions are satisfied:

$5<s1<20$ and $5<s2<20$.

* * * * *